Patented July 13, 1943

2,324,285

UNITED STATES PATENT OFFICE 2,324,285

TRIAZINE DERIVATIVES

Gaetano F. D'Alelio and James W. Underwood, Pittsfield, Mass., assignors to General Electric Company, a corporation of New York No Drawing. Application March 17, 1942,
Serial No. 435,041

11 Claims. (Cl. 260—248)

This invention relates to new chemical compounds and more particularly to triazine derivatives. The invention especially is concerned with the production of new and useful bis-(diamino triazinyl) cyanoalkylene (including cyanoalkylidene) disulfides.

The triazine derivatives of this invention may be represented graphically by the following general formula:

I
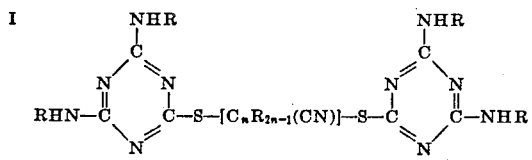

In the above formula $n$ represents an integer and is at least 1 and not more than 2 and R represents a member of the class consisting of hydrogen and monovalent hydrocarbon and substituted hydrocarbon radicals, more particularly halo-hydrocarbon radicals.

Illustrative examples of radicals that R in Formula I may represent are: aliphatic (e. g., methyl, ethyl, propyl, isopropyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, iodophenyl, etc. Preferably R in Formula I is hydrogen. However, there also may be produced in accordance with the present invention compounds such, for instance, as those represented by the general formulas:

II
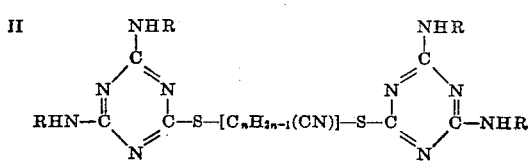

and, more particularly,

III
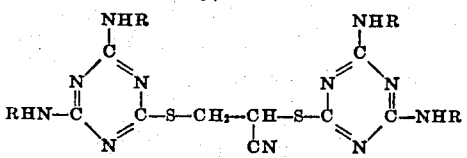

where $n$ and R have the same meanings as above given with reference to Formula I.

The new compounds of this invention may be used, for example, as pharmaceuticals, plasticizers, fungicides, insecticides, as an intermediate in the preparation of dyes and other chemical compounds, for instance as an intermediate in producing derivatives thereof such as ureido, hydrazino, carbamyl, amidine, methylol, etc., derivatives. These new compounds are especially valuable in the preparation of synthetic resinous compositions. Thus, they may be condensed with, for example, aldehydes, including polymeric aldehydes, hydroxy aldehydes and aldehyde-addition products, to yield condensation products of particular utility in the plastics and coating arts. Such condensation products are more fully described and are specifically claimed in our copending application Serial No. 435,040, filed concurrently herewith and assigned to the same assignee as the present invention. These new compounds also may be compounded with rubber, both natural and synthetic, to modify the properties of the rubber.

Various methods may be employed to produce the chemical compounds of this invention. We prefer to prepare them by effecting reaction between a diamino [(—NHR)₂] mercapto symmetrical triazine (s-triazine) and a di-halogenated alkyl cyanide (di-halogenated cyano-alkane) in the presence of a hydrohalide acceptor, the reactants being employed in the ratio of two mols of the diamino mercapto s-triazine per mol of the di-halogenated alkyl cyanide.

Illustrative examples of mercapto diamino s-triazines that may be used, depending upon the particular end-product desired, are:

2-mercapto 4,6-diamino s-triazine (4-mercapto 2,6-diamino s-triazine; 6-mercapto 2,4-diamino s-triazine)
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine 2-mercapto 4-(3'-butenylamino) 6-isopropylamino s-triazine
2-mercapto 4-pentylamino 6-cyclohexylamino s-triazine
2-mercapto 4-hexylamino 6-xenylamino s-triazine
2-mercapto 4-chlorocyclopentylamino 6-toluido s-triazine
2-mercapto 4-bromotoluido 6-benzylamino s-triazine
2-mercapto 4-phenylchloroethylamino 6-phenylethylamino s-triazine
2-mercapto 4-chloroanilino 6-ethylphenylamino s-triazine
2-mercapto 4-cycloheptylamino 6-isopropylphenylamino s-triazine
2-mercapto 4-isopropylanilino 6-phenylpropylamino s-triazine
2-mercapto 4-iodoanilino 6-toluido s-triazine
2-mercapto 4-dichloroanilino 6-chloroethylamino s-triazine
2-mercapto 4-fluoroanilino 6-benzylamino s-triazine
2-mercapto 4-amino 6-methylamino s-triazine
2-mercapto 4-aminoanilino 6-ethylphenylamino s-triazine
2-mercapto 4-amino 6-benzylamino s-triazine Typical examples of di-halogenated alkyl cyanides (di-halogenated alkyl nitriles) that may be employed, depending upon the particular end-product sought, are:
Alpha, alpha-dichloro propionitrile
Beta, beta-dichloro propionitrile
Alpha, beta-dibromo propionitrile
Alpha, alpha-diiodo butyronitrile
Beta, beta-dichloro butyronitrile
Alpha, beta-dibromo valeronitrile
Alpha, alpha-diiodo beta-methyl butyronitrile
Alpha, beta-dichloro alpha, beta-dimethyl butyronitrile
Alpha, beta-dibromo alpha-methyl beta-benzyl capronitrile
Alpha, beta-diiodo alpha-cyclohexyl beta-tolyl butyronitrile
Alpha, alpha-dichloro beta, beta-diphenyl valeronitrile
Alpha-chloro alpha-iodo acetonitrile
Alpha, alpha-dibromo propionitrile
Alpha-chloro beta-bromo alpha-naphthyl beta-xylyl butyronitrile
Dichloroacetonitrile
Dibromoacetonitrile
Diiodoacetonitrile
Alpha, beta-dibromo beta-methyl gamma-phenyl valeronitrile
Alpha, beta-dichloro propionitrile Various hydrohalide acceptors may be employed. We prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the di-halogenated alkyl nitrile may be carried out in any suitable manner, but preferably is effected in the presence of a suitable solvent or mixture of solvents. Although various solvents and solvent mixtures may be employed, we prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

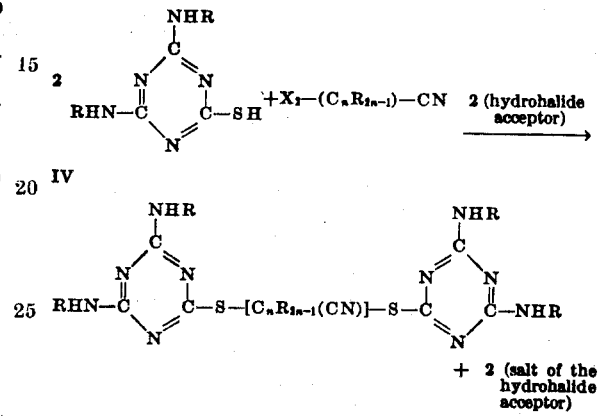

In the above equation X represents halogen and $n$ and R have the same meanings as given above with reference to Formula I.

In order that those skilled in the art better may understand how the present invention may be carried into effect, the following illustrative examples are given. All parts are by weight.

Example 1

This example illustrates the preparation of alpha, beta-bis-(diamino s-triazinyl) cyanoethylene disulfide, the formula for which is

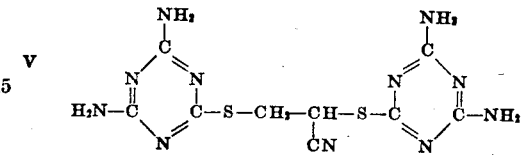

| | Parts (approximately) |
|---|---|
| 4,6-diamino 2-mercapto s-triazine (thioammeline) | 143 |
| Alpha, beta-dichloropropionitrile | 63 |
| Sodium hydroxide | 40 |
| Alcohol | 50 |
| Water | 50 |

The sodium hydroxide and the 4,6-diamino 2-mercapto s-triazine were dissolved in the mixture of water and alcohol. The alpha, beta-dichloropropionitrile was now added and the reaction was allowed to proceed at room temperature for about 90 hours. The reaction mass was then heated under reflux at the boiling temperature of the mass for 1 hour. The mass was stirred during the heating period. After cooling to room temperature the product, alpha, beta-bis(diamino s-triazinyl) cyanoethylene disulfide, which had precipitated from the mass, was filtered from the mother liquor and well washed with water. No attempt was made to recover any more product from the mother liquor. A yield of 133 parts of the dried and purified product was obtained.

Example 2

Bis-(diamino s-triazinyl) cyanomethylene disulfide is produced in essentially the same manner as described under Example 1 with the exception that, instead of alpha, beta-dichloropropionitrile, an equivalent amount of dichloroacetonitrile is used.

Example 3

Alpha, beta-bis-[4,6-di-(methylamino) s-triazinyl-2] cyanoethylene disulfide is prepared in essentially the same manner as described under Example 1 with the exception that, instead of thioammeline, an equivalent amount of 4,6-di-(methylamino) 2-mercapto s-triazine is employed.

Other examples of the new chemical compounds of this invention are listed below:

Beta, beta-bis-(diamino s-triazinyl) cyanoethylidene disulfide
Bis-(4-amino 6-methylamino s-triazinyl-2) cyanomethylene disulfide
Bis-[4,6-di-(methylamino) s-triazinyl-2] cyanomethylene disulfide
Alpha, alpha-bis-(diamino s-triazinyl) cyanoethylidene disulfide
Beta-phenyl alpha, alpha-bis-(4-pentylamino 6-ethylamino s-triazinyl-2) cyanoethylidene disulfide
Beta, beta-bis-(diamino s-triazinyl) cyanopropylidene disulfide
Alpha, beta-bis-(diamino s-triazinyl) cyanopropylene disulfide
Alpha-methyl beta, beta-bis-(4-anilino 6-benzylamino s-triazinyl-2) cyanopropylidene disulfide
Alpha, beta-dimethyl alpha, beta-bis-(4-xylidino 6-amino s-triazinyl-2) cyanopropylene disulfide
Alpha-butyl alpha, beta-bis-(4-amino 6-naphthylamino s-triazinyl-2) cyanoethylene disulfide
Alpha-cyclopentyl beta-phenyl alpha, beta-bis-[4,6-di-chloroanilino) s-triazinyl-2] cyanoethylene disulfide
Alpha, beta-di-(chlorophenyl) alpha, beta-bis-(diamino s-triazinyl) cyanoethylene disulfide
Beta-benzyl alpha, alpha-bis-(diamino s-triazinyl) cyanopropylidene disulfide
Bromotolyl bis-(4-anilino 6-methylamino s-triazinyl-2) cyanomethylene disulfide
Phenyl bis-(diamino s-triazinyl) cyanomethylene disulfide
Alpha-benzyl alpha, beta-bis-(diamino s-triazinyl) cyanoethylene disulfide
Alpha, beta-dimethyl alpha, beta-bis-(diamino s-triazinyl) cyanoethylene disulfide
Alpha, beta-bis-(4-amino 6-methylamino s-triazinyl-2) cyanoethylene disulfide
Alpha, beta-diethyl alpha, beta-bis-(4-iodoanilino 6-toluido s-triazinyl-2) cyanoethylene disulfide
Alpha-methyl alpha, beta-bis-(4-benzylamino 6-naphthylamino s-triazinyl-2) cyanoethylene disulfide
Beta-phenyl alpha, beta-bis-(diamino s-triazinyl) cyanoethylene disulfide
Chlorophenyl bis-(diamino s-triazinyl) cyanomethylene disulfide
Alpha, beta-bis-(diamino s-triazinyl) cyanobutylene disulfide
Alpha-(bromoethyl) alpha, beta-bis-(diamino s-triazinyl) cyanoethylene disulfide
Bis-(4-fluoroanilino 6-amino s-triazinyl-2) cyanomethylene disulfide
Alpha, beta-bis-(diamino s-triazinyl) cyanopentylene disulfide In a manner similar to that described above with particular reference to the production of bis-(diamino s-triazinyl) cyanoalkylene disulfides, corresponding asymmetrical and vicinal triazine derivatives may be prepared.

What we claim as new and desire to secure by Letters Patent of the United States is:

1. Chemical compounds corresponding to the general formula

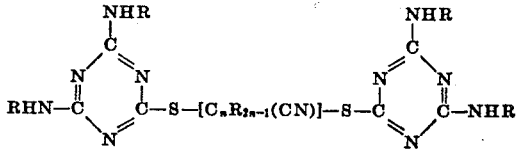

where $n$ is an integer and is at least 1 and not more than 2, and R represents a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein $n$ is 1.

4. Chemical compounds corresponding to the general formula

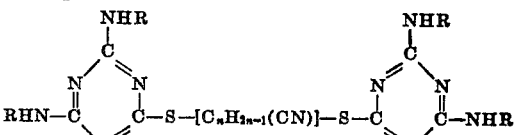

where $n$ is an integer and is at least 1 and not more than 2, and R represents a member of the class consisting of hydrogen and monovalent hydrocarbon and halo-hydrocarbon radicals.

5. Chemical compounds corresponding to the general formula

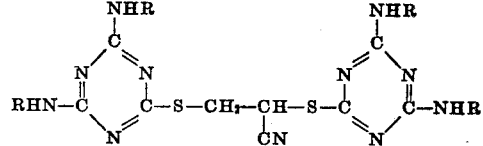

where R represents a member of the class consisting of hydrogen and monovalent hydrocarbon and halo-hydrocarbon radicals.

6. Bis-(diamino s-triazinyl) cyanomethylene disulfide.

7. A bis-(diamino s-triazinyl) cyanoethylene disulfide.

8. Alpha, beta-bis-(diamino s-triazinyl) cyanoethylene disulfide.

9. The method of preparing chemical compounds corresponding to the general formula

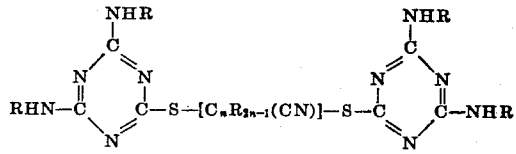

where $n$ is an integer and is at least 1 and not more than 2 and R represents a member of the class consisting of hydrogen and monovalent hydrocarbon and halo-hydrocarbon radicals, said method comprising effecting reaction, in the presence of a hydrohalide acceptor, between (1) a mercapto s-triazine corresponding to the general formula

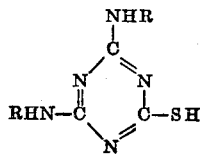

where R has the meaning above given, and (2) a di-halogenated alkyl cyanide corresponding to the general formula $$X_2-(C_nR_{2n-1})-CN$$

where X represents halogen and $n$ and R have the meanings above given, said reactants being employed in the ratio of two mols of the former to one mol of the latter.

10. A method as in claim 9 wherein the hydrohalide acceptor is an alkali-metal hydroxide.

11. The method of preparing alpha, beta-bis-(diamino s-triazinyl) cyanoethylene disulfide which comprises effecting reaction, in the presence of a hydrohalide acceptor, between thioammeline and alpha, beta-dichloropropionitrile in the ratio of two mols of the former to one mol of the latter.

GAETANO F. D'ALELIO.
JAMES W. UNDERWOOD.